June 25, 1968  M. SCHONBERGER  3,389,500
WINDOW REGULATING MECHANISM
Original Filed June 28, 1961  7 Sheets-Sheet 1
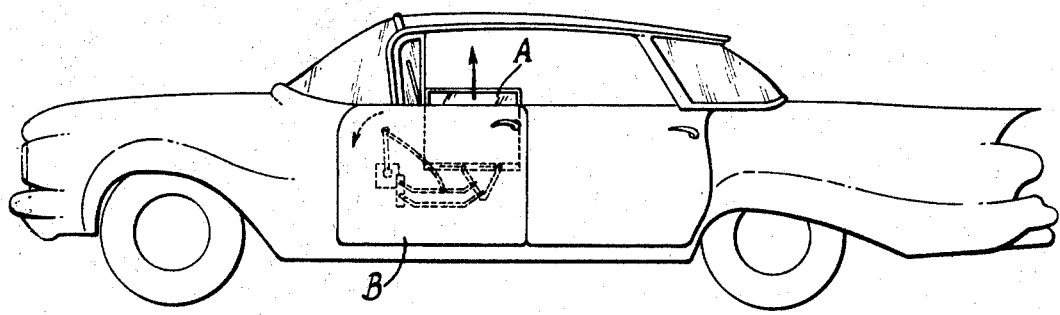
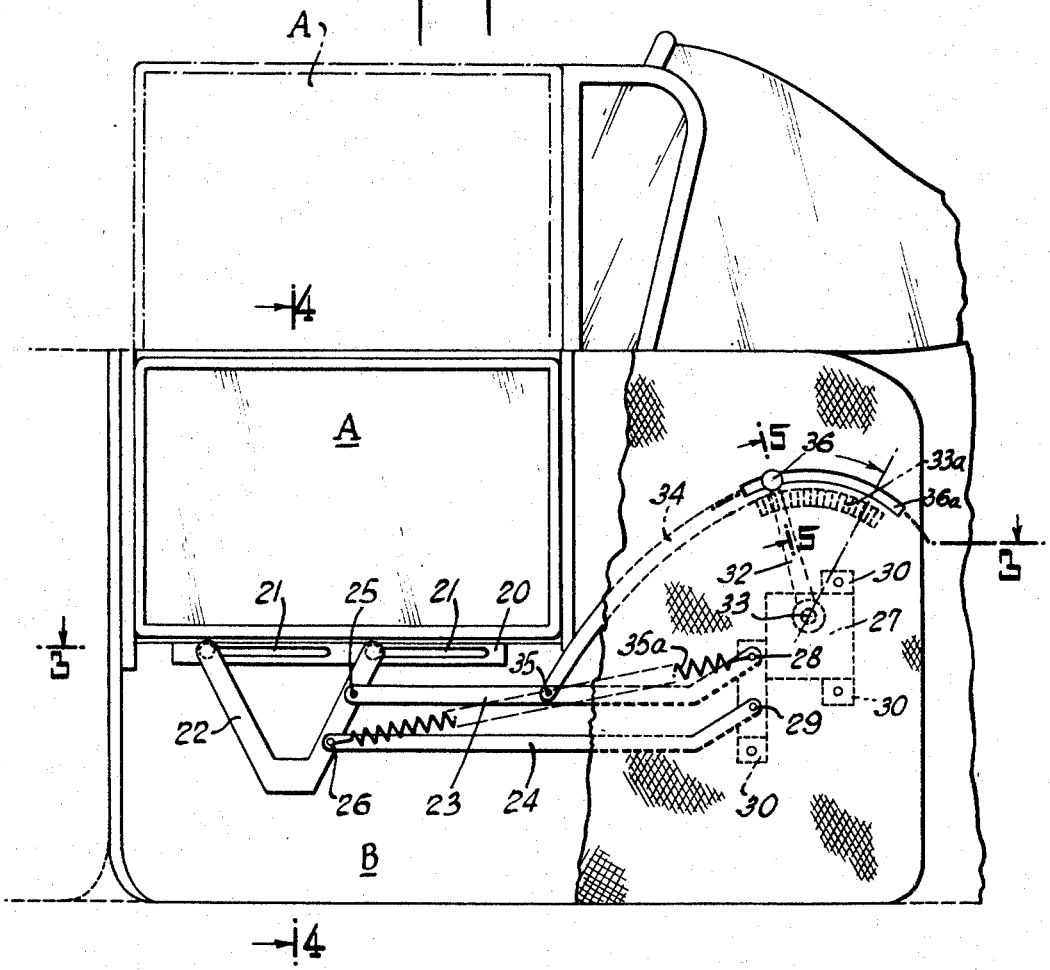
INVENTOR
MILTON SCHONBERGER
BY
ATTORNEY

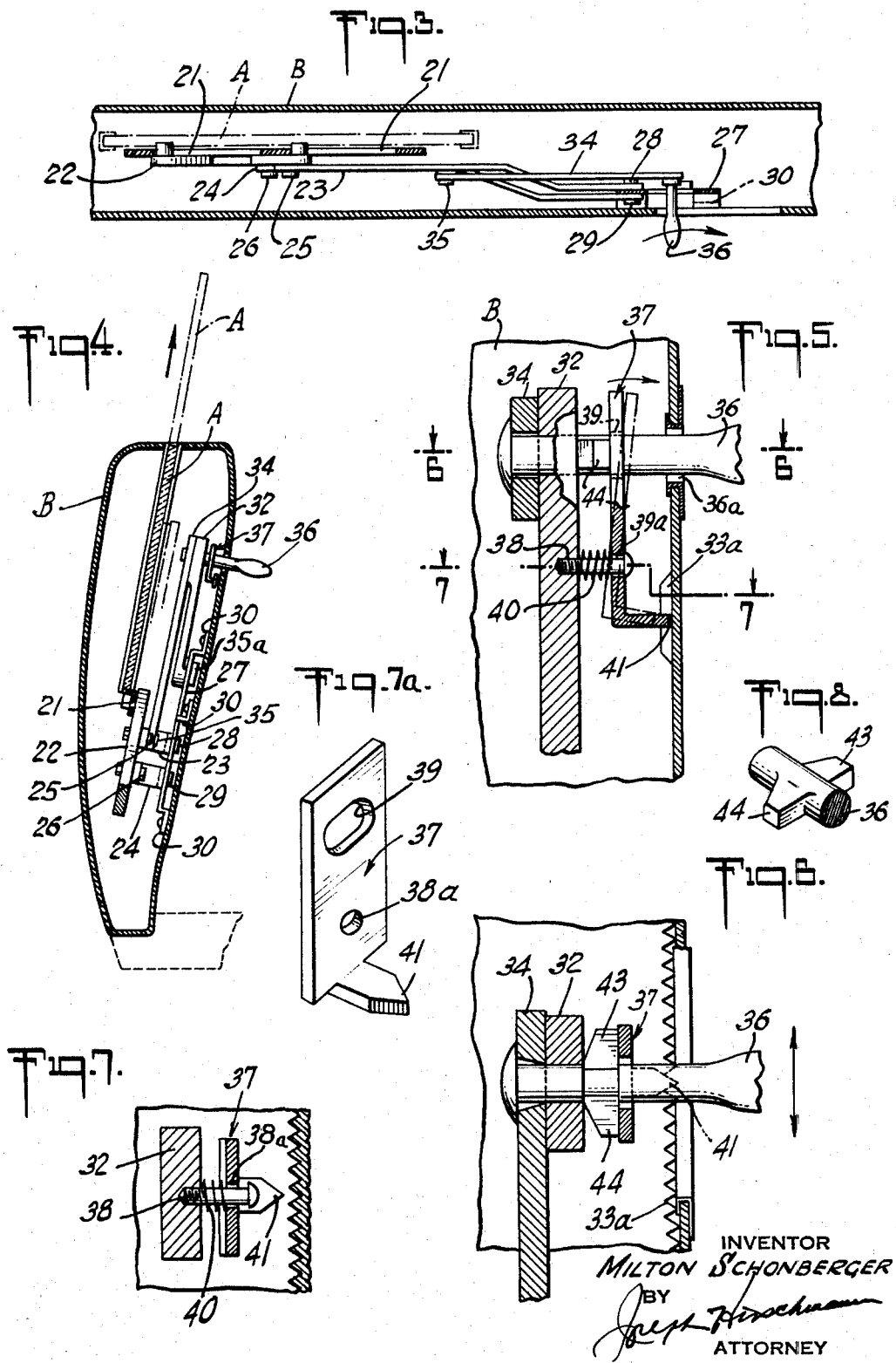

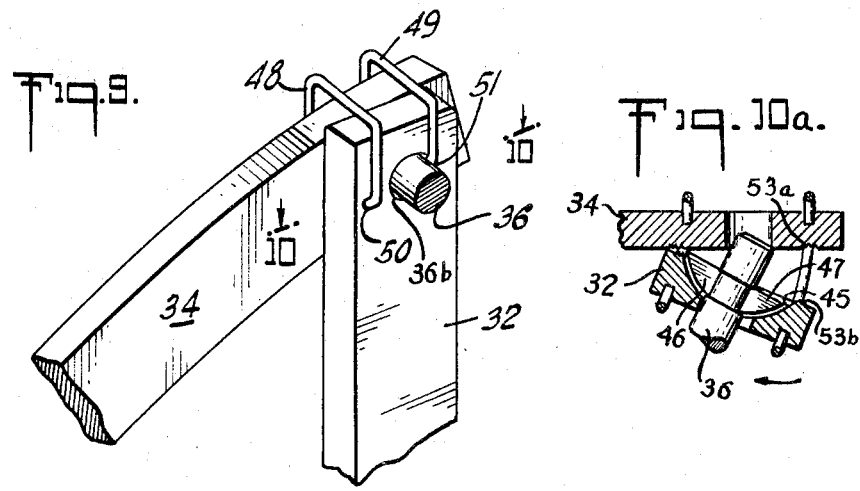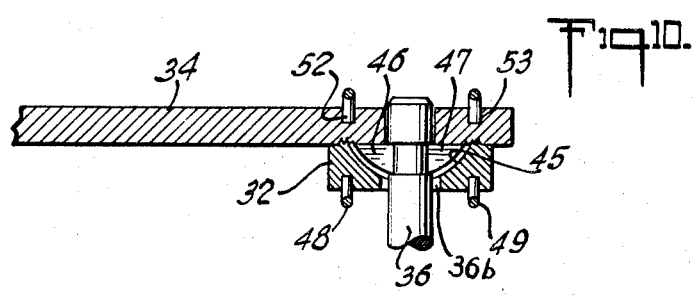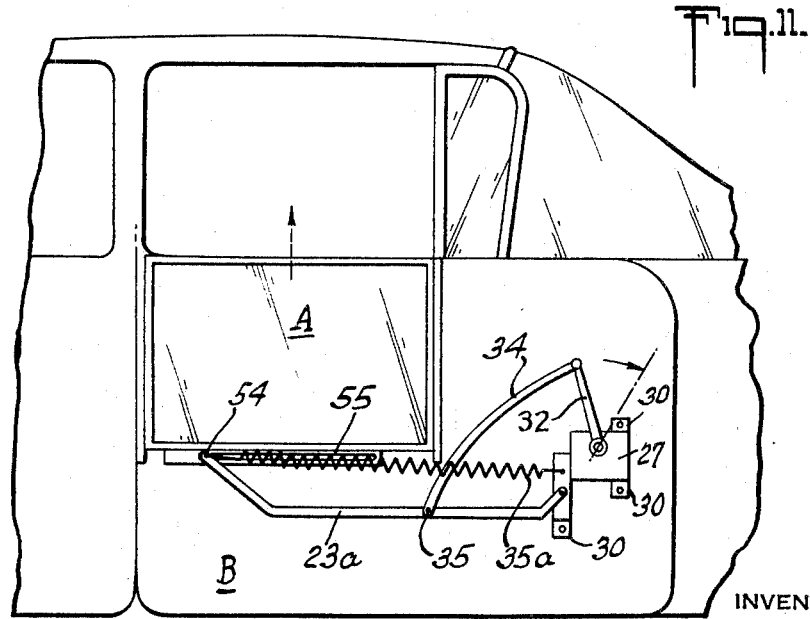

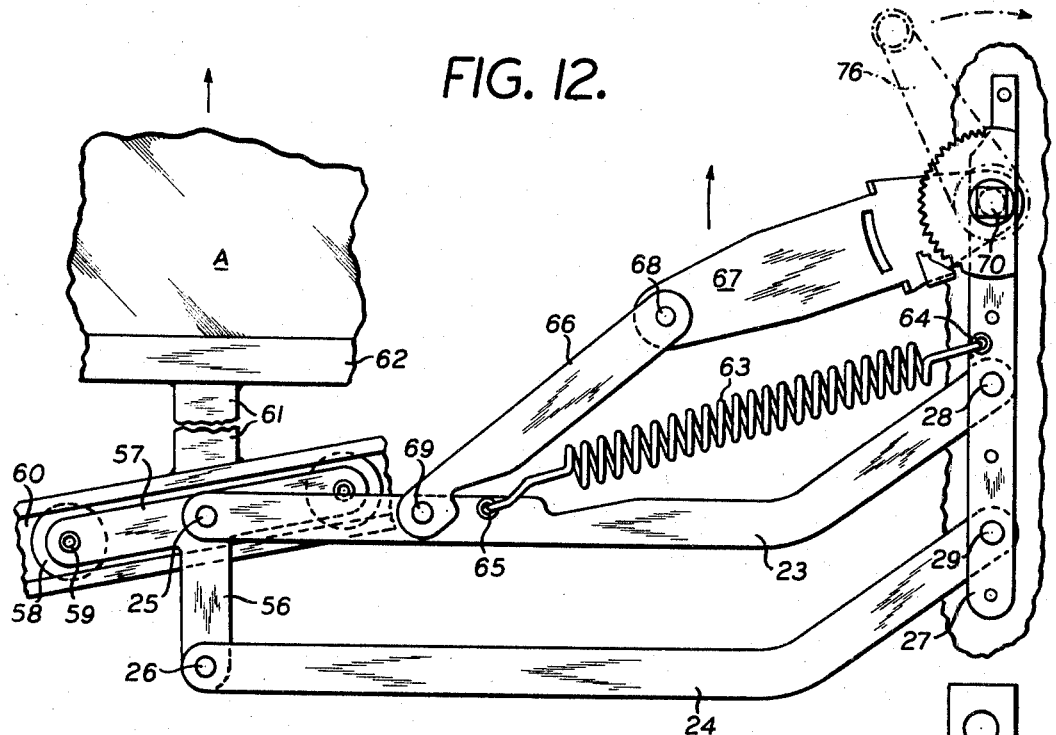
FIG. 12.
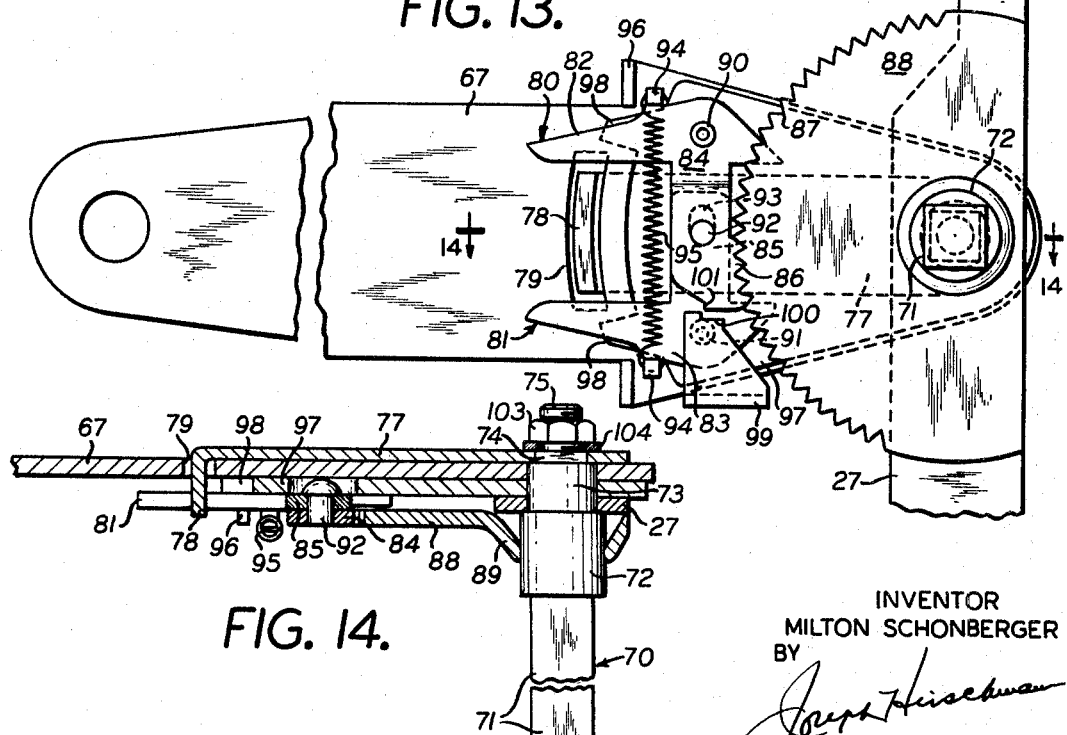
FIG. 13.
FIG. 14.
INVENTOR
MILTON SCHONBERGER
BY
ATTORNEY.

June 25, 1968  M. SCHONBERGER  3,389,500
WINDOW REGULATING MECHANISM
Original Filed June 28, 1961  7 Sheets-Sheet 5
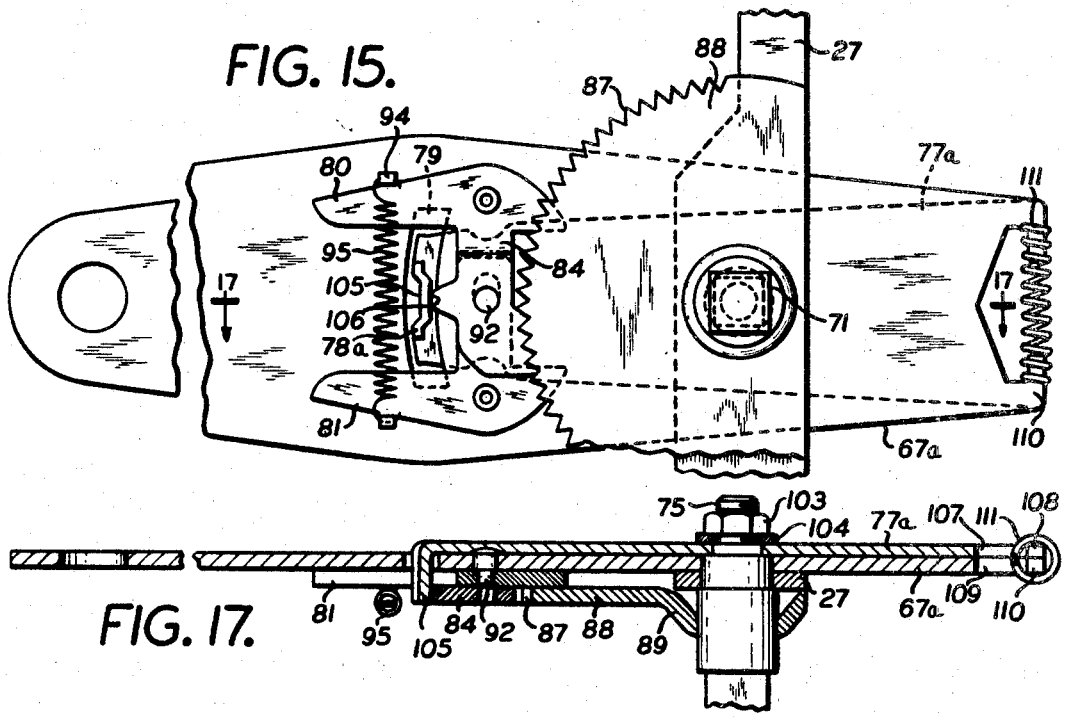
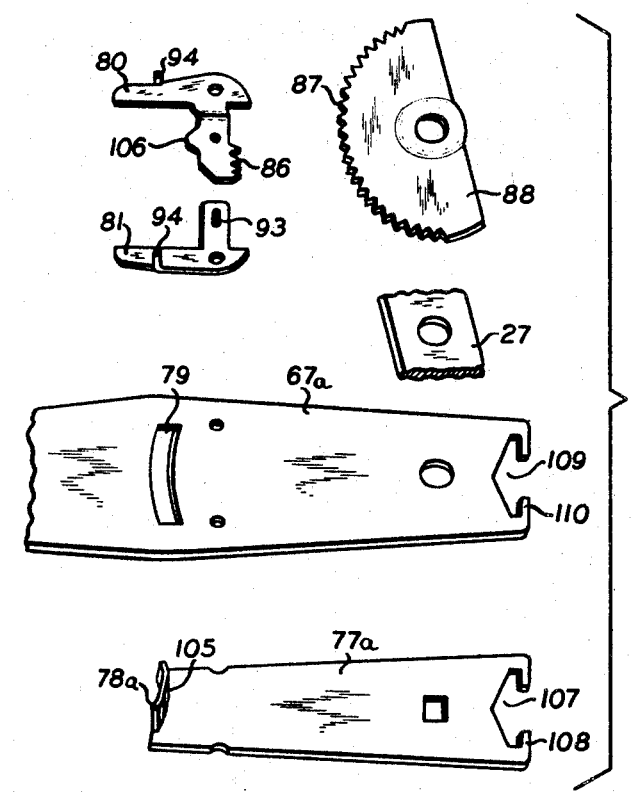
INVENTOR
MILTON SCHONBERGER
BY
*Joseph Hirschmann*
ATTORNEY.

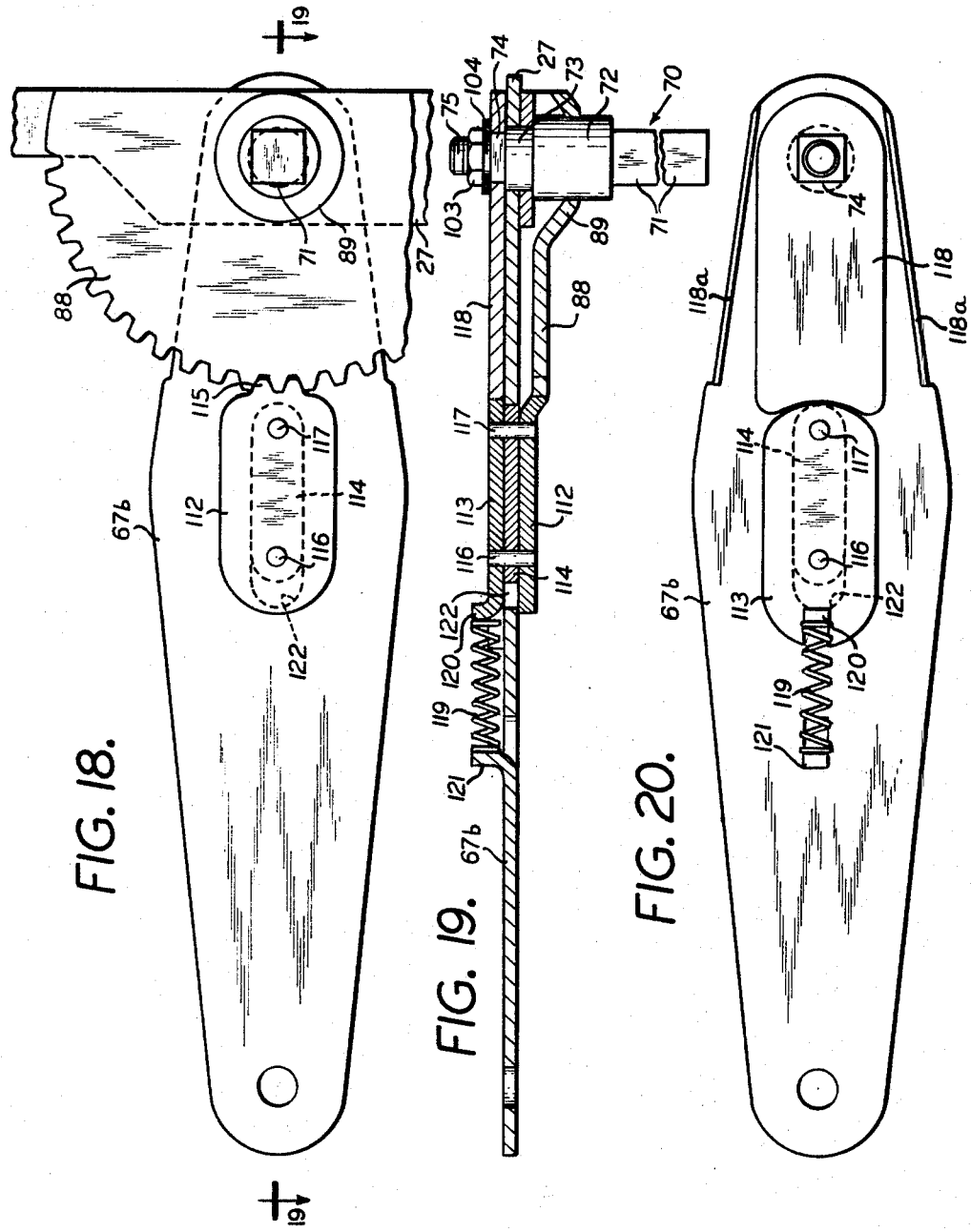

INVENTOR
MILTON SCHONBERGER
BY
*Joseph Hirschman*
ATTORNEY.

United States Patent Office 3,389,500
Patented June 25, 1968

3,389,500
WINDOW REGULATING MECHANISM
Milton Schonberger, Westwood, N.J., assignor to I.N.M.
Industries Corporation, New York, N.Y., a corporation
of Delaware
Continuation of application Ser. No. 133,752, June 28,
1961. This application Mar. 24, 1966, Ser. No. 537,245
4 Claims. (Cl. 49—351)

This is a continuation of application Ser. No. 133,752 filed June 28, 1961, now abondoned.

The present invention relates to window regulating mechanism, both manually and motor-operated, and particularly for the windows of automobiles.

It is the general object of the invention to provide a regulating mechanism for windows which is simple in construction, inexpensive to manufacture, and convenient and reliable in operation.

More specifically, it is an object of the invention to provide a mechanism for adjusting the height of an automobile window which is operated by the simple throw of a lever in one or the opposite direction, whereby the window may be opened or closed to the desired degree by one simple movement.

It is a further object of the invention to provide a window regulating mechanism which consists substantially wholly of stamped metal parts, and thus can be easily and cheaply made on a large scale.

More particularly, it is an object of the invention to provide a mechanism of the type indicated which is free of gears and pinions and other machined parts and which can be assembled as a unit, for example, outside of the automobile and installed on the door or body of the automobile with a minimum of labor and adjustment.

Additional objects are to provide a locking mechanism which prevents accidental movement of the window and which is released upon initial movement of the operating handle or crank; to provide a secondary lock or blocking mechanism which prevents opening or closing of the window by force applied directly to the window and which is likewise rendered temporarily ineffective on initial movement of the operating handle in either direction; to provide resilient means which return the locking devices to their original positions on release of the operating handle; to provide a regulating mechanism whose whole range of adjustment is traversed upon movement of the operating handle through no more than about 90° or even considerably less; and to provide a regulating mechanism which is adapted for use with both windows which move more or less vertically, as in the case with the front and rear windows of sedans, and windows which are pivoted and are thus rotated to open or closed position, as in the rear windows of convertibles and hardtops.

Further objects of the invention are to provide a window regulating mechanism whose operating parts are characterized by a single lever or a pair of parallel levers, acting directly on the bottom of the window frame or on a slotted member connected thereto, and actuated to raise or lower the window by a simple arm connected to the single lever or to one of the two parallel levers and controlled from a shaft which is rotated by an operating lever or crank; to provide a pre-tensioned counterbalancing spring which is so anchored that it balances approximately the whole weight of the window substantially throughout its range of movement; to provide an improved crank-operated lever type of window regulating mechanism, wherein the shaft of the crank can be disposed so far below the sill of the window that neither the hand grip nor the crank extends above such sill; and to provide a lever mechanism connected with the window which can readily be adapted for operation by an electric motor, all of the said parts, namely, the single and double levers, the counterbalancing spring, operating arm, crank shaft, the aforementioned locking mechanism, both main and auxiliary, and lock-releasing mechanism being directly mounted or anchored on a small main supporting plate on which they can be assembled as a unit and then installed in assembled condition within the door or body of an automobile or other vehicle, or within a hollow wall beneath the window of a building, or the like.

As the invention is of particular utility in connection with the adjustment of the windows of vehicles, it will be further described as employed for the regulating of the front and rear windows of automobiles.

In accordance with one form of the present invention, the window regulating mechanism is operated by a handle which passes through an arcuate slot in the inner panel of the door and may be supported by an arm loosely mounted on a shaft journalled in the hollow interior of the door and which need not extend to the outside of the panel. To the handle is pivotally connected a link whose other end is pivotally connected with a lever intermediate the ends of the latter. Such lever is fixedly pivoted at one end, and its other end transmits the force exerted opon the operating handle to raise or lower the window. The lever can be associated with a second lever of similar configuration and parallel thereto, and similarly fixedly mounted at one end, the free ends of both levers being pivotally connected to a supporting member, on which rests the window frame.

In another and preferred embodiment of my invention, there is provided an operating handle or crank mounted on a shaft on the outer side of the door panel, so that only the shaft extends through such panel and the arcuate slot is dispensed with. The window-supporting lever or levers are in this case mounted similarly to the first-mentioned embodiment, but the force is applied by way of the shaft. The operating arm is in this case loosely mounted on the shaft and is connected to the shaft by way of a coupling arm which also acts to release a locking mechanism which holds the window in adjusted position, such release occuring after a small initial movement of the handle.

In further embodiments of the invention, means are provided for blocking the window operating mechanism against movement when external force is applied to the window itself tending either to open it or close it, while in still another form of the invention, the handle or crank is replaced by an electric motor controlled by a suitable switch.

All of the embodiments of my invention are characterized by the feature that the operating parts, other than the handle, but including the counterbalancing spring, can be assembled as a unit on a small supporting plate and the assembly easily mounted on the inside door panel. The tension in the spring can thus be preset for any particular weight or type of window at the factory where the regulating mechanisms are manufactured, and then be mounted on the inside door panel at the assembly plant without further adjustment.

The above and other objects and advantages of the invention will become apparent from the following more detailed description thereof taken together with the accompanying drawings wherein:

FIG. 1 is an external view of an automobile of the type commonly known as a "hardtop" in which my improved window regulating mechanism is illustrated as installed in the front left door;

FIG. 2 is a view on an enlarged scale showing the window operating mechanism installed in the front left door of a convertible as seen from inside the automobile, the panel and fabric covering of the door being partly broken away;

FIG. 3 is a horizontal section taken along the line 3—3 of FIG. 2;

FIG. 4 is a vertical section along the line 4—4 of FIG. 2;

FIG. 5 shows a partial longitudinal section through the operating lever and illustrates details of the locking mechanism;

FIGS. 6 and 7 are sections taken, respectively, along the lines 6—6 and 7—7 of FIG. 5;

FIG. 7a is a perspective view of the pawl forming part of the locking mechanism;

FIG. 8 is a similar view of another detail of the locking mechanism;

FIGS. 9 and 10 illustrate a modification of the locking mechanism, FIG. 10 being a section along the line 10—10 of FIG. 9;

FIG. 10a shows the parts of FIG. 10 disengaged on the initial movement of the handle shaft.

FIG. 11 shows a simplified modification which is suitable for operating the windows of sedans which have window guide channels running along the full length of the window opening in the doors;

FIG. 12 shows an elevation of a modified construction of the window-regulating mechanism;

FIG. 13 is an enlarged view in elevation of the locking and release mechanism of the embodiment illustrated in FIG. 12;

FIG. 14 is a central section of the locking mechanism taken along the line 14—14 of FIG. 13;

FIG. 15 shows in elevation a further modification of the locking device and shows further a secondary locking or blocking mechanism which prevents manual lifting or lowering of the window;

FIG. 16 is an exploded view in perspective, on a reduced scale, of the locking and release mechanism shown in FIG. 15;

FIG. 17 is a central section of the mechanism shown in FIG. 15 and is taken along the line 17—17 of such figure.

Figure 21:
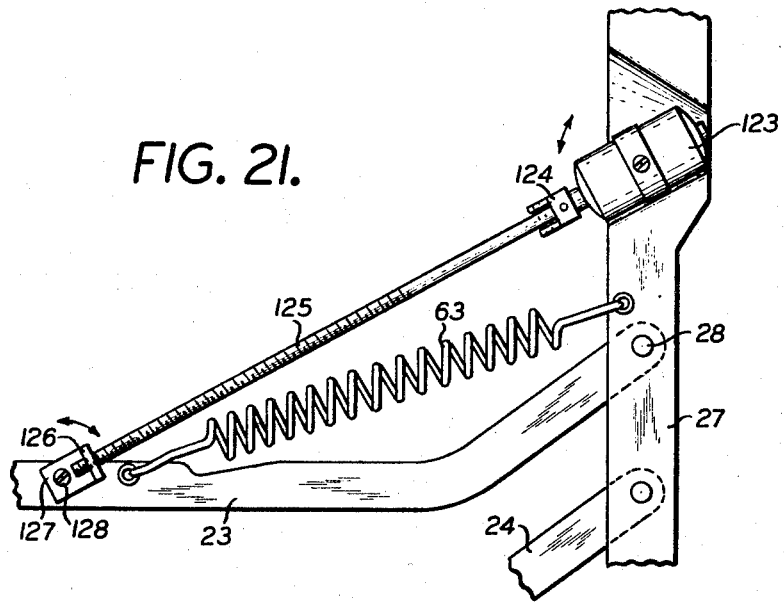
Figure 22:
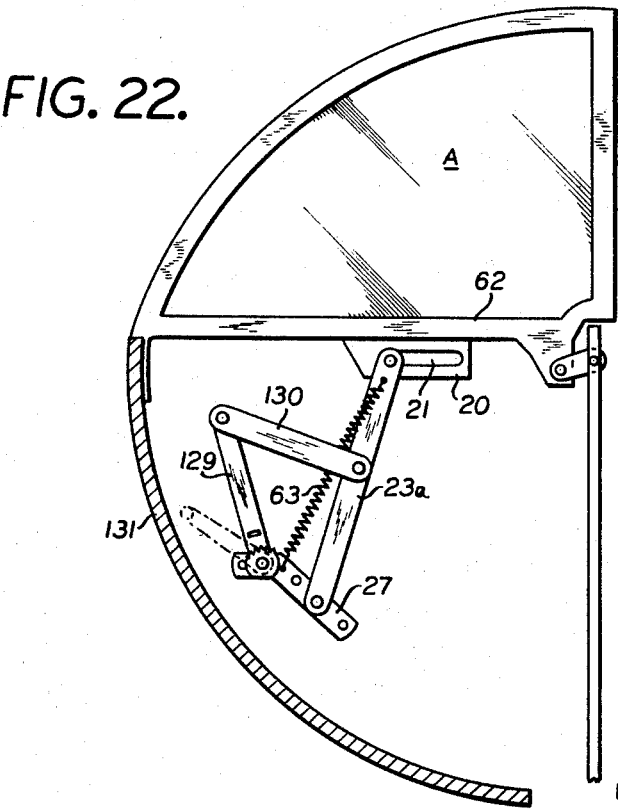

FIG. 18 is a view in elevation of a still further form of locking mechanism;

FIG. 19 is a central section taken along the line 19—19 of FIG. 18;

FIG. 20 is a view in elevation of the opposite side of the mechanism shown in FIG. 18;

FIG. 21 illustrates a suitable arrangement for push-button operation of the window regulating mechanism by an electric motor; while FIG. 22 shows a further modified form of the invention as applied to the rear window of a convertible car.

Referring to the drawings, and particularly to FIGS. 1 to 8 thereof, there is shown attached to the bottom of the glass window A which slides up and down in known manner in a pair of channels framing the window opening, a bar 20 which is riveted or otherwise secured to the movable bottom frame of the window or forms an integral extension thereof. Horizontal slots 21 loosely receive pins, rivets or rollers extending laterally from the upper ends of a V-shaped support 22 which can accordingly move horizontally in both directions relative to the window frame while simultaneously moving in a vertical direction.

In the form of the invention shown in FIGS. 1 to 8, the V-shaped support 22 is actuated to raise and lower the window by two parallel levers 23, 24 pivoted thereto at 25, 26, respectively. The levers are straight throughout most of their length, but are bent upwardly at their right-hand end portions (as viewed in FIG. 2) and are pivotally secured at their right ends to a main bearing plate 27 at 28, 29. The plate has protruding from it metal tabs 30 by which it and the whole assembly may be secured to the inside face of the panel covering the car door or body below the window opening.

An arm 32 loosely mounted on a rivet or pin 33 secured to the plate 27 supports a handle 36 which passes through an arcuate opening 36a in the door panel. To the inner end of handle 36 is pivotally secured an operating arm or link which connects handle 36 with the upper parallel lever 23 to which it is pivoted at 35. The arm 34 is gently curved, as shown. When the handle 36 is pushed forward of the car, the arcuate arm 34 moves the lever 23 upwardly, and with it go the lower lever 24 and the V-support 22, the latter moving simultaneously upwardly and forwardly. Because the pins or rollers at the upper ends of the support 22 move freely in the slots 21 of bar 20, and because such upper ends are maintained in substantial horizontal alignment, the window is moved vertically without horizontal or binding action, so that smooth operation of the windows is obtained.

In order to reduce the resistance to upward movement of the window, its weight is in large part counterbalanced for easier operation by means of a coil spring 35a stretched between the fulcra 26 and 28. As the window is raised, as explained more fully below, the spring aids the upward movement and contracts as it does so; in the closed condition of the window, the spring is in its most contracted condition, while when the window is in its lowermost position, the spring is at its maximum extension. The spring can, however, be anchored at any other point on the fixed plate 27, and its other end can be secured to a point on the support 22 or on the lever 23 or 24, due regard being had to the degree of tension in the spring so as to counterbalance substantially completely the weight of the window.

Both because of friction and the counterbalancing effect of the spring, the window will stay in any desired position of adjustment, from fully open to fully closed. However, the invention provides means for automatically locking the window in any of its adjusted positions, so that it can not be opened from the outside or forcibly raised by hand, nor be shaken loose so as to ride up or down in its channels on a rough road.

One form of locking mechanism is shown in FIGS. 4 to 8, wherein an L-shaped pawl 37 (FIGS. 5, 7 and 7a) mounted on supporting arm 32 by means of a headed bolt 38 which passes through an opening 38a in the pawl. The pawl is held spaced from arm 32 and urged away from the lever by a spring 40. The lower end of the pawl is of reduced width and terminates in a point or tooth, as shown at 41, which normally engages an arcuate serrated track or rack 33a which is substantially coextensive with the range of movement of the lever 32 and is preferably stamped into the inside metal facing or panel of the door, or can consist of a corrugated strip of metal or plastic secured to the inside face of the panel. Near the upper end of the pawl is an elongated opening 39 through which the handle 36 freely passes.

The operating handle 36 is connected to the arm 32 by being passed through an opening at the upper end of the arm which is slightly larger than the diameter of the handle, as shown in FIG. 5, and which may be tapered like the larger opening in operating arm 34, in the more or less horizontal direction, as shown in FIG. 6. This allows a slight amount of play to the handle in the horizontal direction on initial movement thereof. A pair of horizontally spaced lugs 43, 44 extends laterally of the lever 36 (FIG. 8) between arm 32 and pawl 37. When the handle is pulled or pushed back and forth in its arc in order to operate the window, it rotates initially, for a short distance, about an approximately vertical axis sufficient to cause the upper end of the pawl 37 to move clockwise or counterclockwise, as viewed in FIG. 5, by one or the other of the lugs. This causes the tooth 41 of the pawl 37 to be moved out of engagement with the teeth of the serrated track 33a, and the operating arm 34 is activated on further movement of the handle. As the handle is released after the window has reached the desired position, the pawl again re-engages the serrated track under the action of spring 40, effectively locking it and the arms 32 and 34 against rotary motion.

An alternative locking structure is shown in FIG. 9. In this construction, the operating handle 36 passes through an enlarged hole 36b in the supporting arm 32 and also through an enlarged hole 34a in the arcuate arm 34 in which it can freely move. The arm 32 has on its inner surface which faces the arm 34 a concave depression 45 which accommodates the lugs 46, 47 which protrude laterally from the operating handle 36. U-shaped springs 48 and 49 yieldingly urge arm 34, arm 32 and operating handle 36 toward each other into the position shown in FIG. 9, the free ends of the springs being bent and being received in apertures 50, 51 in arm 32 and in apertures 52, 53 in the arm 34 (FIG. 10). On the facing surfaces of arm 34 and arm 32 are interlocking areas 53a and 53b which may be annular in extent, and serve to prevent relative angular movement of the parts 32 and 34, except upon manual operation of handle 36. The interlocking surfaces 53a and 53b may consist of projecting ribs or serrations, or they may be provided with Carborundum or Carborundum-grit surfaces facing each other.

In operation, when the handle 36 is moved in one or the other direction, it has sufficient free play in the horizontal direction to cause lugs 46 and 47 to separate the parts 32 and 34 (see FIG. 10a) against the action of springs 48 and 49. During this initial movement of the handle, for example, to the left as shown in FIG. 10a, the lug 46 pivots at its free left end on the surface of arm 34, while the lug 47 presses against the concave surface 45 as the handle 36 rocks within the enlarged openings 36b and 34a. As soon as the surfaces 53a and 53b are disengaged from either other, continued movement of the handle in slot 36a carries with it the arm 34 and the window is lowered. It will be apparent that once the surfaces 53a and 53b no longer lock the parts 32 and 34 to each other, their angular relationship can change as the handle continues to be moved. Similarly, on movement of the handle 36 in the opposite direction, corresponding movements of the parts are effected, but in an opposite sense. It will be understood that the supporting arm 32 is sufficiently flexible and/or is mounted sufficiently loosely on the stud or rivet 33 to enable it to assume the angular position shown in FIG. 10a.

As can be readily seen, upon release of the handle 36, the parts 32 and 34 are returned by springs 48 and 49 into their parallel, interlocking relationship in which they resist movement of arm 34 under the action of manual force applied directly to the window to open or close it, because the interlocking areas 53a and 53b do not permit relative movement between arms 32 and 34.

FIGURE 11 illustrates a simplified form of the invention suitable for installation in a sedan type of automobile. Whereas convertibles and hardtops have no support for the window along one edge, a sedan provides a fully enclosed channel to receive and guide the glass window. In this embodiment, the lower parallel lever 24 of the above-described construction is omitted, and likewise the V-shaped support 22, since the channels framing the window opening in the door of the sedan and the rounding of the upper edges of the window glass itself allow the window to travel up and down in its side channels while constrained to a purely translatory vertical movement. Accordingly, the mechanism of FIG. 11 contains but one lever 23a which differs from the levers 23, 24 in having an upward bend also at its left end, as viewed in such figure. The length and angle of this bend in the lever will vary, depending upon the height of the window opening. The free end of lever 23a is provided with a roller or the like mounted on a pin 54, the roller moving within the closed slot 55 in the bottom part of the window frame or in a bar secured thereto. The counterbalancing spring 35a is anchored on the main plate 27 and is fixed to the lever 23a at the pin 54. The point of connection with lever 23a will vary with the amount of tension desired for counterbalancing purposes. Otherwise the operation of the mechanism is basically the same as in the previously described construction, it being understood that the handle 36 again passes through an arcuate slot in the inside panel of the door.

In the case of narrow rear windows of 4-door sedans, the necessary lift of the window can be obtained while keeping the operating mechanism within the outline of the rear door by shortening the lever 23a, placing it slightly lower on the plate 27, and connecting the arcuate arm 34 nearer the left end of the lever.

It will be obvious that by shifting the fulcrum 35 of the arm 34 to the left or right in FIGS. 2 and 11, the "throw" or lift of the window can be varied for a given angle of movement of the arm 32, the tension of the spring 35a being adjusted accordingly, when necessary. The fulcrum 35 may be made adjustable, as by a bolt and slot connection, so as to make the same mechanism suitable for a variety of windows.

In the construction shown in FIGS. 12 to 14, the window A is regulated with the aid of a T-shaped member 56 whose upper portion 57 is slightly oblique to conform to the corresponding part of the window regulating mechanism of a well-known type of automobile. The ends of the part 57 are provided with rollers 58 mounted on pins or shafts 59. The rollers ride in a track 60 of channel shape which is connected by a bar 61 with the frame 62 of the window. To aid in lifting the window, there is provided as in the other constructions, a counterbalancing spring 63 which is anchored at 64 to the main plate 27 and at its other end is attached at 65 to an intermediate portion of the upper of the two parallel levers 23 and 24. The spring is pre-tensioned to a degree corresponding to the weight of the window and is so mounted that it expands and contracts to a minimal extent during the movements of the window. To this end, it is preferably anchored to the plate 27 at or adjacent to the pivot 28, and is connected to lever 23 intermediate the ends of the latter.

A link 66 pivoted to the operating arm at 68 is pivoted at 69 to the lever 23 intermediate the ends of the latter. The arm 67 is rotatable on a circular portion 73 of a shaft 70 having a non-circular section 71 to which the crank lever 76 is secured (see FIGS. 12 and 14). The shaft 70 is also provided with a second non-circular (preferably square) portion 74 on which is mounted a release and coupling arm 77 provided with a lateral extension or tongue 78 at right angles to the main body of the arm 77. The extension 78 passes through an elongated aperture 79 in the operating arm 67, as can best be seen in FIG. 13. The shaft 70 has also an intermediate circular portion 72 of enlarged diameter compared to the section 73, so as to provide a shoulder which bears against the supporting plate 27. The shaft is provided also with a threaded end portion 75.

The locking mechanism includes a pair of bell-crank levers 80 (FIGS. 13, 14) and 81, the lever 80 having the legs 82 and 84 and the lever 81 having the legs 83 and 85. The leg 84 of the lever 80 is provided with a series of teeth 86 which are adapted to mesh with teeth 87 of a circular ratchet plate or segment 88 fixed to the main plate 27, as by welding or riveting. The ratchet segment is provided with an expanded hub 89 which bears on the shaft portion 72. The bell crank levers 80 and 81 are pivoted at 90 and 91 on a supporting plate 97 provided with extensions 98 serving as backings for the levers 80 and 81 to prevent distortion of the latter. The bell crank levers 80 and 81 are joined by a pin and slot connection 92, 93 in such manner that rotation of one of the bell crank levers will cause the rotation of the other in the opposite direction.

The levers 80 and 81 are provided with lugs 94 which serve to anchor a tension spring 95 acting to bias the levers in the direction of engagement of the teeth 86 with the teeth 87. Tongues 96 extend from the arm 67 and act as stops which are engaged by the levers 80 and 81 as they are moved by extension 78 when the arm 77 travels for a short distance in either direction.

Connected to but spaced inwardly a short distance from the arm 67 is a plate 99 provided with a shoulder 100 which is adapted to lock with a shoulder 101 at the lower end of the leg 84 of the lever 80 when the arm 67 is rotated a short distance clockwise, as viewed in FIG. 13. The arm 77 is secured on the shaft 70 against a shoulder provided by the shaft portion 72 by the nut 103 tightened against the washer 104.

In the operation of the mechanism of FIGS. 12 to 14, initial movement of the crank lever 76 in either direction causes the extension 78 to rotate one or the other of the levers 80 and 81. This causes the leg 84 to be lifted sufficiently for its teeth to clear those of the fixed circular ratchet 88. This enables the hand crank 76 to be rotated further until the extension 78 engages one or the other of the edges bordering the slot 79; and when this happens, the operating arm 67 becomes coupled to the shaft 70 by way of parts 77, 78. Upon further rotation of the hand crank 76, the levers 23, 24 are rotated on their pivots 28 and 29 to raise or lower the window. Upon release of the hand crank 76, the spring 95 returns the bell cranks to their locking position. The tongues 96 serve to limit the movement of the bell cranks 80 and 81 and cooperate with the extension 78 in coupling arm 67 to the shaft by way of arm 77.

Any force or effort tending to raise the window will cause the arm 67, as viewed in FIG. 13, to rise. This will effect interlocking of shoulder 100 of the plate 99 with shoulder 101 of the bell crank lever 80 and will positively lock the teeth 86 and 87 in their intermeshing condition. At about the same time, the lower tongue 96 will engage leg 83 of lever 81, and tend to force teeth 86 more firmly into teeth 87. Any further movement of the arm 67 in the upward direction will thus be blocked and hence no further movement of the window can be accomplished. Upon any force or effort seeking to lower the window, the arm 67 will rotate counterclockwise, as viewed in FIG. 13. This will cause the tongue 96 to engage the bell crank lever 80 and force the teeth 86, 87 into closer enmeshing relation. Further movement of the arm 67 will thereupon be blocked and likewise any further downward movement of the window beyond the initial movement required to actuate the tongue 96.

The length of slot 93 determines the degree of separating movement of th legs 82 and 83 of the two bell crank levers. When either of the legs 82 and 83 is moved by the extension 78, the plate 97 shifts slightly in the opposite direction. Thus, when extension 78 moves the lever 80 clockwise, as viewed in FIG. 13, and as the extension reaches the end wall of opening 79, the levers 80 and 81 have reached the limit of their movement in the releasing position, so that from that point on, the extension 78 moves both the operating arm 67 as well as the plate 97, carrying along the latter by way of the lever 80 and its pivoting pin. This provides a larger bearing surface for the extension 78 and insures against distortion of the parts.

When the arm 67 is moved in either direction upon manual forcing of the window, either up or down, the teeth 86 may have a tendency to rise out of engagement with the teeth 87. This is prevented by the action of the projections 96 which engage the rear surfaces of the levers 80 and 81. This action forces the teeth 86 into more positive engagement with the teeth 87 and overcomes any lateral force tending to cam the teeth 86 out of engagement with teeth 87.

The mode of anchoring the spring constitutes an important feature of the present invention. The spring is anchored on the main plate 27 and is attached to the lever 23, so that the spring can be assembled along with the other parts of the mechanism outside of the automobile and the whole mechanism installed as a unit. This is an important advantage because the spring must be placed under a high tension, which would be inconvenient were the spring to be secured directly to the door itself. The spring is anchored to the main plate 27 at a point quite close to the pivot of the lever to which its other end is attached. This close positioning of the anchor point of the spring and the pivot of the lever insures that the spring in its most highly tensioned condition, i.e., when the window is fully lowered, is under only a relatively slightly greater tension than in its least tensioned condition; that is, when the window is at its uppermost position.

The tension in the spring may amount to as much as 180 lbs., although this is not critical. The tension on the spring will depend in large part upon the weight of the glass window and its direction of movement. The pretensioning of the spring and the location of its fixed anchor point close to the pivot of the lever insures that there will not be too great a difference in the pull of the spring, so that the effort required to move the window at its lowermost position will be approximately the same as that required to move it from its uppermost position. The effect is therefore that of imparting a free-floating condition to the window and substantially only the friction of the parts needs to be overcome to raise or lower it. In a number of highly satisfactory constructions of the regulating mechanism made by me, the spring was 7 to 7½ in. long in its most contracted condition (when the window was in its uppermost position), and in its fully extended condition, that is, when the window was in its lowermost condition, the spring was only about ⅜ to ½ inch longer.

I prefer to employ a spring of such strength that when the window is in its uppermost position, it is completely counterbalanced, so that very little effort is required to lower the window in view of the fact that gravity aids such lowering. When the window is in its lowermost position, it may be slightly overcompensated, so far as its own weight is concerned, but there will still be a small amount of friction to be overcome when the window is raised. This is in contrast to known arrangements in which it is much more difficult to lower the window than to raise it, because with each lowering, effort must be expended to tension the spring to counterbalance the weight of the window.

FIGS. 15 to 17 show a modification of the structure of FIGS. 12 to 14. The plate 97 on which the bell crank levers are pivoted in the structure of FIGS. 12 to 14 is eliminated and the bell crank levers 80 and 81 are pivoted directly upon the operating arm 67a is provided with a lateral extension 78a similar to the extension 78 of FIGS. 12 to 14, except that it is depressed, as shown at 105. This depressed portion is arranged to engage a projection 106 on the leg 84 of the lever 80 in the normal locked position of the levers 80, 81. The parts 105 and 106 thus provide an auxiliary or secondary lock which prevents release of the levers 80, 81 and thus prevents movement of the arm 67a in either direction, except by operation of the hand crank. As in FIG. 13, the bell crank levers 80 and 81 are urged into locking position by a spring 95 anchored in lugs 94, the corresponding parts, as in the other figures of drawing, being similarly numbered. The width of the depressed portion 105 is sufficiently great to allow for a slight movement of the window made possible by the clearance in the various connections; this slight movement will not be sufficient to cause disengagement of the parts 105 and 106. Such disengagement can be effected only upon rotation of the shaft 70 to which the arm 77a is fixed. Upon rotation of the shaft 70 by the operating crank handle, the depressed portion 105 will first become disengaged from the projection 106 and then will rotate one or the other of the levers 80, 81 to effect disengagement from the teeth 87. Thereupon the arms 77a and 67 become coupled to the shaft, and further rotation of the crank handle will effect adjustment of the window.

As indicated in FIG. 16, the leg 84 of the lever 80, including the parts 86 and 106, is offset to enable the horizontal portions of the levers 80, 81 to lie in the same plane. Both of the arms 67a and 77a extend a considerable distance at the opposite side of the shaft 70 and are provided with cutouts 109, 107 respectively, of such shape as to provide lugs 110 and 108 respectively. The lugs of the two arms are in registry, as indicated in FIGS. 15 and 17 and serve to anchor the opposite ends of a compression spring 111. This spring serves to bring the parts 67a and 77a into their zero or neutral position upon release of the crank handle.

FIGS. 18 to 20 illustrate a simplified construction embodying a known type of sliding dog in my improved mechanism for regulating a vehicle window. The locking member or dog is shown at 112 and is connected to a follower 113 and to a slide 114 by means of pins 116 and 117. The dog 112 is provided with teeth 115 offset from the plane of the main body of the dog and engaging with corresponding teeth in the ratchet segment 88. The teeth are non-camming in shape; that is, lateral movement of the sets of teeth with respect to each other will not cause disengagement of the teeth.

The slide 114 moves within an elongated slot 122 in the arm 67b. The follower 113 is urged toward the right, as viewed in FIGS. 18 to 20, to cause engagement of the teeth 115 with the ratchet by means of a compression spring 119 acting on lugs 120 and 121, struck respectively from the parts 113 and 67b, the latter corresponding to the arms 67 and 67a described hereinabove.

The follower 113 is adapted to be moved to the left by a cam 118 mounted on the square portion 74 of the shaft 70. Upon initial movement of the crank arm secured to the shaft, the cam 118 will move the follower 113 a sufficient distance to cause disengagement of the teeth 115 from the ratchet 88. Thereupon the continued movement of the cam 118 will effect rotation of the arm 67b because the slot 122 is of such limited length that the cam 118 becomes locked against the right-hand end of the follower 113; simultaneously or alternately the cam can engage a stop 118a on arm 67b.

FIG. 21 shows a construction in which the arm 67, 67a and 67b is replaced by a motor 123 controlled by a switch of any suitable type within reach of the driver or passenger. The motor shaft is connected by way of a universal joint 124 with a worm shaft 125 which is received within a threaded opening in the leg 126 of an angular bracket 127 which is pivotally mounted on the lever 23 as by a rivet, pin, or screw 128. As will be readily understood, the pivotal mounting of the bracket 127 and the universal joint 124 allow for changes in the angular relationship between the lever 23 and the shaft 125.

As also will be easily understood, the worm shaft 125 and threaded bracket 127 provide a secure lock for holding the window in adjusted position and preventing forced manual opening or closing of the window.

FIG. 22 shows a linkage and lever structure for use with windows of the rotating type, such as the rear windows of convertible and hardtop automobiles. The window A is provided with a plate 20 secured to its frame 62 and has an elongated slot 21 in which rides a roller or pin at the free end of the lever 23a whose other end is fixedly pivoted to the mounting plate 27. The arm 129 corresponds to the arms 67, 67a and 67b, previously described, such arm being associated with any of the locking devices previously described. The arm 129 is connected by way of a link 130 with an intermediate portion of the lever 23. A counterbalancing spring 63 is connected to lever 23a and plate 27. An arcuate guide 131 is secured to the frame 62 of the window.

Upon rotation of the crank handle in the clockwise direction (after release of the locking mechanism), the lever 23a will be rotated clockwise and the window A will then be rotated in a counterclockwise direction. Upon reversal of the movement of the crank handle, the window will be moved clockwise to its raised position.

I claim:
1. A window regulating mechanism comprising a supporting plate, a pair of parallel levers pivoted at spaced points on said plate, a window supporting member to which the other ends of the levers are pivoted, an operating arm pivotally connected with one of the levers, at a point spaced from the pivots thereof, means for locking said arm against movement, a shaft passing through the plate, said operating arm being loosely mounted on the shaft, a coupling arm rigidly connected with the shaft and acting to couple the operating arm to the shaft at the end of an initial small angular movement of the shaft, and a handle connected to said shaft for rotating the same in opposite directions.

2. A window regulating assembly as defined in claim 1, wherein the levers are bent upwardly intermediate their ends, and a pre-tensioned spring anchored on the plate adjacent to the pivot of one of the levers and connected to such lever beyond the bend thereof.

3. A window regulating mechanism comprising a supporting plate, a lever pivoted on the plate for actuating a window, a shaft supported on the plate, an operating arm connected at one end to said lever and loosely mounted on the shaft, bell-crank levers associated with the arm and connected for simultaneous movement in opposite directions, a spring connecting said levers, a segmental toothed rack, one of said bell-crank levers being provided with teeth normally engaging with said rack to lock the arm against movement, a handle for rotating the shaft in opposite directions, means for coupling the arm to the shaft upon disengagement of the said teeth as the handle is rotated through a small angle, said spring returning the bell-crank levers to locking position upon release of the handle, and a pre-tensioned counterbalancing spring anchored on the supporting member and connected to the first-mentioned lever.

4. A window regulating mechanism comprising a supporting plate, a lever pivoted at one end at a fixed point on said plate and at its opposite end directly supporting a movable window, an operating arm pivotally connected to the lever intermediate the ends of the latter, means connected to the arm and pivoted on said plate, and operable by a single, undirectional stroke in one or the opposite direction to effect movement of the lever through the whole range of movements of the window, said lever having a bend intermediate its ends, the said plate being secured wholly to one side of the window, and a pre-tensioned counterbalancing spring anchored on the plate adjacent to the pivot of the lever and connected to the other end of the lever, the said lever, plate and spring being capable of assembly as a unit and of being simultaneously mounted on an automobile by securing the plate to an inside panel of the automobile.

References Cited

FOREIGN PATENTS

| | | |
|---|---|---|
| 547,024 | 9/1922 | France. |
| 695,727 | 10/1930 | France. |
| 265,784 | 2/1927 | Great Britain. |
| 155,667 | 8/1956 | Sweden. |

DAVID J. WILLIAMOWSKY, *Primary Examiner.*

HARRISON R. MOSELEY, EARL J. WINTER, *Examiners.*

J. K. BELL, *Assistant Examiner.*